(12) United States Patent
Klaiqi

(10) Patent No.: US 12,472,885 B2
(45) Date of Patent: Nov. 18, 2025

(54) DIGITAL LICENSE PLATE, SYSTEM AND METHOD FOR OPERATING SAME

(71) Applicant: Sahit Klaiqi, Munich (DE)

(72) Inventor: Sahit Klaiqi, Munich (DE)

( * ) Notice: Subject to any disclaimer, the term of this patent is extended or adjusted under 35 U.S.C. 154(b) by 197 days.

(21) Appl. No.: 18/517,475

(22) Filed: Nov. 22, 2023

(65) Prior Publication Data

US 2024/0246481 A1  Jul. 25, 2024

(30) Foreign Application Priority Data

Nov. 24, 2022 (DE) .................. 10 2022 131 087.6

(51) Int. Cl.
*B60R 13/10* (2006.01)
*H04L 9/40* (2022.01)

(52) U.S. Cl.
CPC .......... *B60R 13/10* (2013.01); *H04L 63/0428* (2013.01)

(58) Field of Classification Search
CPC ........ H04L 63/0428; B60R 13/10; B60Q 1/56
USPC ........................................................ 380/28
See application file for complete search history.

(56) References Cited

U.S. PATENT DOCUMENTS

| | | | | |
|---|---|---|---|---|
| 11,040,672 | B2* | 6/2021 | Batten | B60R 13/10 |
| 11,449,298 | B2* | 9/2022 | Batten | B60R 25/01 |
| 12,002,383 | B2* | 6/2024 | Parkes | B60Q 1/509 |
| 12,054,105 | B2* | 8/2024 | Knafou | B60Q 1/503 |
| 2006/0290495 | A1* | 12/2006 | Hughes | G06Q 30/06 340/571 |
| 2011/0078933 | A1 | 4/2011 | Lukawitz et al. | |
| 2017/0046929 | A1* | 2/2017 | Strom | G08B 5/36 |
| 2019/0174279 | A1* | 6/2019 | Verma | G07B 15/063 |
| 2022/0185204 | A1 | 6/2022 | Knafou et al. | |

FOREIGN PATENT DOCUMENTS

| | | |
|---|---|---|
| DE | 102006025023 A1 | 11/2007 |
| DE | 102008043830 A1 | 5/2010 |
| DE | 202010006825 U1 | 9/2011 |
| DE | 102018200669 B3 | 4/2019 |

* cited by examiner

*Primary Examiner* — Amare F Tabor
(74) *Attorney, Agent, or Firm* — Barnes & Thornburg LLP

(57) ABSTRACT

A digital license plate for a motor vehicle includes a display device for displaying a sequence of letters and/or digits to form a vehicle registration number, a storage unit for storing files, an authentication unit for authenticating a file stored in the storage unit to a predetermined source, an encryption unit for encrypting and decrypting a file stored in the storage unit, a transmitting and/or receiving unit for wireless or wired interaction with a server, and a control unit designed to control the display device to display, by the display device, a vehicle registration number contained in a file if the authentication unit confirms that the file originates from the predetermined source.

17 Claims, 1 Drawing Sheet

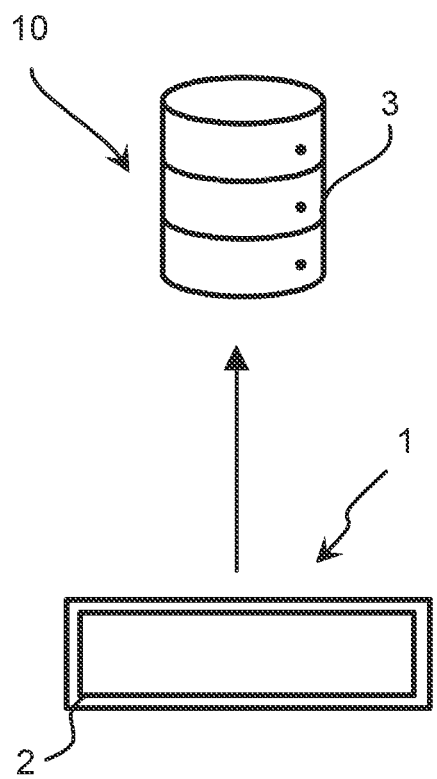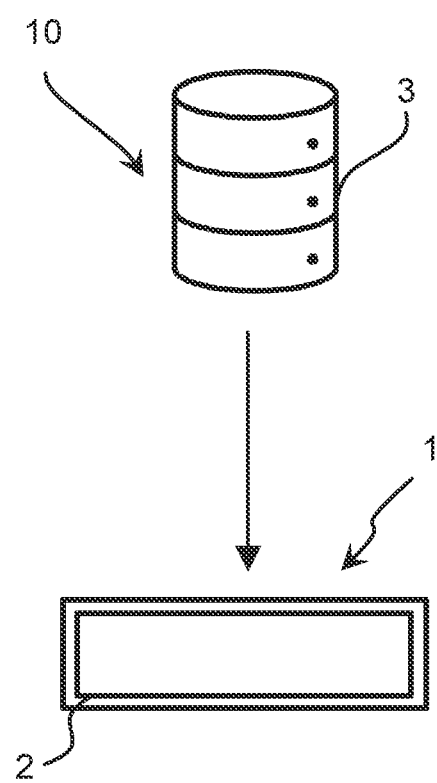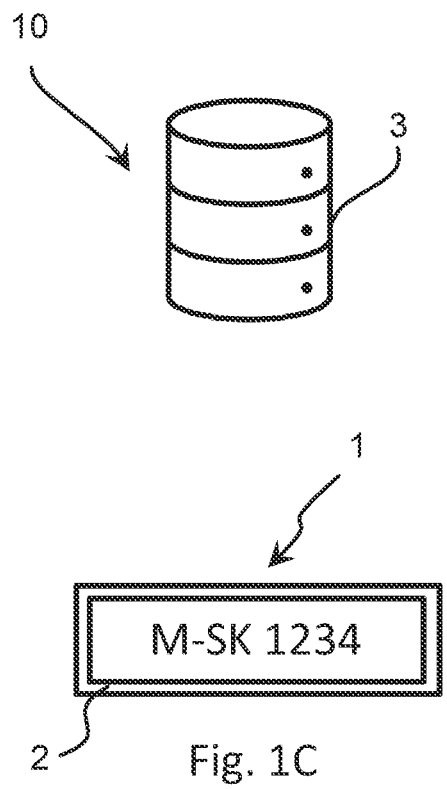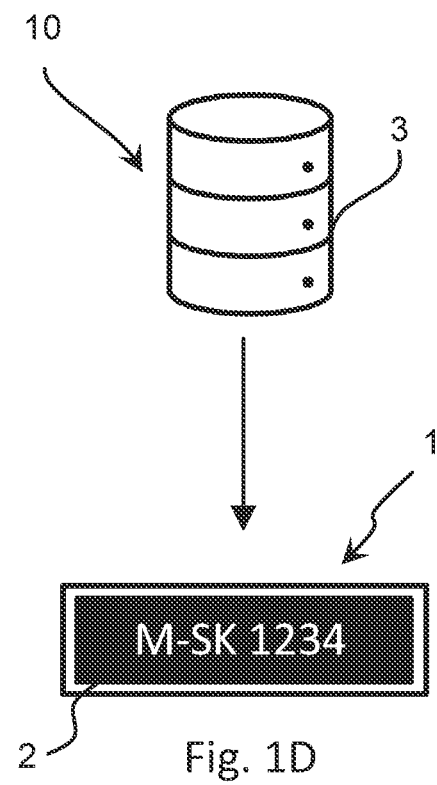

DIGITAL LICENSE PLATE, SYSTEM AND METHOD FOR OPERATING SAME

CROSS REFERENCE AND PRIORITY CLAIM

This patent application claims priority to German Patent Application No. 10 2022 131 087.6, filed Nov. 24, 2022, the disclosure of which is incorporated herein by reference in its entirety.

FIELD

The presently disclosed embodiments relate to a digital license plate for a motor vehicle, to a system for operating a digital license plate and to a method therefor.

BACKGROUND

License plates, or vehicle registrations, are usually issued by motor vehicle registration offices and are a unique identifier for vehicles subject to registration that are allowed to participate in road traffic. License plates serve as proof of the proper registration of the motor vehicle bearing the license plate and also make it possible to reliably trace the owner of the vehicle. As a rule, license plates consist of a thin aluminum sheet into which the official registration number is embossed. The registration entry can be made up of a sequence of letters and numbers, wherein the underlying system in the logical structure of the registration number sequence is typically subject to different restrictions from country to country.

In addition, plastic license plates have become increasingly popular in recent years and have established themselves as an alternative to aluminum plates.

SUMMARY

A digital license plate for a motor vehicle is provided, comprising a display device for displaying a sequence of letters and/or digits to form a vehicle registration number, a storage unit for storing files, an authentication unit for authenticating a file stored in the storage unit to a predetermined source, an encryption unit for encrypting and decrypting a file stored in the storage unit, a transmitting and/or receiving unit for wireless or wired interaction with a server, and a control unit designed to control the display device to display, by the display device, a vehicle registration number contained in a file if the authentication unit confirms that the file originates from the predetermined source.

BRIEF DESCRIPTION OF FIGURES

Further details, features and advantages of the disclosed embodiments will become apparent from the following description of the figures. In the figures:

FIG. 1A-D each show a schematic overview of one of several states of the system for operating a digital license plate.

FIG. 1A shows a system for operating a digital license plate during initialization in accordance with disclosed embodiments.

FIG. 1B shows transmission of the file containing the vehicle registration number to the digital license plate in accordance with disclosed embodiments.

FIG. 1C shows a system after the digital license plate has received from the server the file containing the vehicle registration number in accordance with disclosed embodiments.

FIG. 1D shows a state of a system in which a file is sent from the server to the digital license plate in order to change the display of the vehicle registration sequence in accordance with disclosed embodiments.

DETAILED DESCRIPTION

The disadvantage of using the familiar types of license plates made of aluminum or plastic is that when the vehicle is changed or de-registered, it is generally not possible to reuse the license plate and it has to be disposed of. In addition, the usual procedure for registering, re-registering or de-registering a vehicle is extremely complex and time-consuming, as this usually has to be carried out on site at an official registration office. This means that the owner of a vehicle has to visit the registration office, accept waiting times or hire a registration service, which takes up considerable resources in the form of time and/or money.

Disclosed embodiments are intended to overcome or at least mitigate the disadvantages listed above and, thus, create an improved license plate that is superior to the previously known embodiments of a license plate. A system for operating the digital license plate achieves further-reaching advantages.

Accordingly, a digital license plate for a motor vehicle is provided, comprising a display device for displaying a sequence of letters and/or digits to form a vehicle registration number, a storage unit for storing files, an authentication unit for authenticating a file stored in the storage unit to a predetermined source, an encryption unit for encrypting and decrypting a file stored in the storage unit, a transmitting and/or receiving unit for wireless or wired interaction with a server, and a control unit designed to control the display device to display, by the display device, a vehicle registration number contained in a file if the authentication unit confirms that the file originates from the predetermined source.

The digital license plate, therefore, has a display device which is capable of displaying a sequence of letters or characters for unique identification of a vehicle provided with the license plate. In order to prevent misuse, however, the digital license plate cannot be used to display any registration sequence freely selectable by a user, but rather the authenticity of the source of a file containing the registration sequence to be displayed by the display device is first checked to ensure that it originates from an authorized issuer (e.g., registration authority or similar).

Once the trustworthy source of the file has been confirmed by means of authentication, the display device is instructed by a control unit to display the vehicle registration sequence contained in the file.

As a rule, communication between the digital license plate and the issuer of the file (usually a registration office or a server under the control of the registration office) takes place using a server, so that the digital license plate has a transmitting and/or receiving unit for communicating with the server.

To further increase the security of the communication, the encryption unit can be used here for encryption and decryption in order to communicate in encrypted form only.

Communication is possible here via the Internet (mobile data, WLAN or wired) or a satellite connection.

The advantage of the digital license plate is that the display of a vehicle registration sequence is only shown if the file containing the registration sequence actually originates from the trusted issuer (the predetermined source, usually the registration office). It is, therefore, not possible for a file not originating from the predetermined source to result in the display of a vehicle registration sequence. This significantly reduces the likelihood of misuse, as it is no longer possible to emboss arbitrary letters and digits on a license plate, as can be done with aluminum plates, for example.

According to an optional modification of the disclosed embodiments, it may be provided that the control unit is further designed to cause a vehicle registration number contained in a file to be displayed, unchanged, by the display device only within a predetermined time period, so that the continuous display of a valid vehicle registration number requires the repeated receipt and verification of the authenticity of a file containing the vehicle registration number.

Therefore, if the vehicle registration sequence displayed by the display device is not updated or validated within the specified time period, the display device can, for example, provide an additional indication or change to a specific color to indicate that the registration of the vehicle bearing the license plate might no longer be valid.

Optionally, it can be provided here that the time period defining how long the display device displays the vehicle registration number contained in the file unchanged is defined by a component of the file itself, wherein the time period can optionally be 1 day, 1 week, 1 month or 1 year.

As already mentioned, the vehicle registration number can be changed to a color that deviates from the standard, e.g., to red or green, so that third parties can easily see that the registration of this vehicle might no longer be valid. It is also possible for additional display elements to be displayed by the display device for identification purposes.

It is, therefore, necessary to carry out a new data exchange with the server within the specified time period so that the vehicle registration number is displayed unchanged by the display device.

For example, the predetermined time period can be 1 day, so that data must be exchanged daily, otherwise the display device will change its appearance accordingly. In this context, it would also be possible to specifically apply for an extension of the predetermined time period (e.g., at the registration office) if it is known in advance that it is intended to remain in an area for a predetermined time period in which the connection to the Internet (or a connection to a satellite) may be problematic. This is particularly useful if a longer stay with the vehicle provided with the digital license plate is planned in regions where it is already known in advance that a corresponding data exchange could prove difficult.

According to a further advantageous modification of the presently disclosed embodiments, it may be provided that if the predetermined time period elapses without the repeated receipt and/or successful verification of the authenticity of a file containing the vehicle registration number, the control unit is further designed to change the display of the display device in order to indicate a possible invalidity of the vehicle registration number, wherein in particular the change of the display device comprises the display of the vehicle registration number in a specific color deviating from the standard, e.g., red.

In addition, according to a development of the presently disclosed embodiments, it may be provided that the file further comprises a component which, after successful verification of the file by the authentication unit, causes the control unit to change the display of the display device in order to display various properties associated with the vehicle registration number by the display device, in particular in order to cause the vehicle registration number to be displayed in a specific color deviating from the standard, e.g., green, in the case of a vehicle registration number registered as stolen.

Regardless of whether the predetermined time period is exceeded, the original display by the display device can also be modified with the aid of the file to be processed by the digital license plate, and, for example, can indicate a vehicle that has been reported stolen or a vehicle that is wanted in the course of a police investigation. Communication can, therefore, also be initiated on the server side in order to make changes to the display device of the digital license plate.

Furthermore, according to the presently disclosed embodiments, it may be provided that the information regarding the predetermined source, in respect of which the authentication unit checks a file, is preset in the license plate, optionally in such a way that it is no longer possible to change the information regarding the predetermined source after an original initialization in the digital license plate.

In order to further limit the possibilities of misuse, the source of the file for displaying the vehicle registration number can be set in advance in the digital license plate so that the vehicle registration number stored there is actually displayed by the display device. For example, the information relating to the source can be stored in an unmodifiable memory module that can only be read and not written to. This can be realized, for example, with a non-volatile, non-erasable PROM memory module, where PROM stands for Programmable Read-Only Memory.

According to an advantageous embodiment of the presently disclosed embodiments, it may be provided that the display device is a digital display, in particular an LCD, LED and/or an OLED display.

It is also possible that each license plate is provided with a unique identifier for communicating with a server. This enables precise communication with a license plate and prevents messages from being sent to recipients who are not the intended communication partners.

For example, when the digital license plate is used for the first time, the unique identifier may be transmitted to the server responsible for issuing the files containing the vehicle registration number. By receiving this unique identifier, the server becomes aware of the presence of this digital license plate, so that the server can initiate the further steps and, if all requirements for this are met, also transmit the file containing the vehicle registration sequence to the digital license plate. The unique identifier of the digital license plate is known to the server for targeted transmission. Communication between the server and the digital license plate can be encrypted in order to make misuse or the like more difficult.

Disclosed embodiments further relate to a system for operating a digital license plate, the system comprising a digital license plate according to one of the aspects discussed above, and a central server which has a database and is designed to communicate with a digital license plate via a transmitting and/or receiving unit, wherein the database contains all license plates (or corresponding unique identifiers) known to the central server, and the central server is designed to send a file to a digital license plate, whereupon the latter, after a successful verification of the authenticity of the received file, displays the vehicle registration numbers contained in the file and any further additional information contained in the file by means of the display device.

The central server can also have an encryption unit for encryption and decryption if the communication with the digital license plate is encrypted.

As a rule, the central server is under official control, e.g., it is operated by the registration office. If, for example, the unique identifier is sent digitally to the registration office together with the vehicle registration document of a future owner, the registration office can send the registration, after verifying and approving it, in a file to the associated license plate, so that the registration is released (activated). A visit to the registration office is no longer necessary.

Furthermore, according to the disclosed embodiments, it may be provided that the central server has at least one interface for accessing the database in order to modify properties of a license plate stored in the database, optionally, wherein the at least one interface enables access by the registration authority, the police, customs or other companies performing sovereign tasks.

As already explained, the central server can be under the control of the registration authority. However, it is of course also conceivable that other state institutions, e.g., the police or customs, have access to the central server in order to make appropriate modifications to a particular license plate. If, for example, a vehicle with a specific registration is reported as stolen, the police can access the central server and modify the corresponding database entry in such a way that a file is sent to the associated license plate so that its display device is changed in such a way that third parties immediately recognize that the vehicle in question is probably stolen or wanted by the police. Advantageously, this is done by changing the color of the vehicle registration number. However, it is clear to a person skilled in the art that the disclosed embodiments also include other ways of recognizing a stolen vehicle by changing the display device. A flashing display of the vehicle registration number is also conceivable in order to indicate an irregularity with the vehicle assigned the digital license plate.

Furthermore, it may be provided that the due date of the main inspection is also contained in the database of the central server and, if a due main inspection of the vehicle has not been successfully carried out or if a corresponding update of the due date of the main inspection of the database has not taken place, for example with the help of access to the database by a testing institute (TÜV (German Technical Inspection Association), DEKRA, etc.), a corresponding transmission is made to the digital license plate, which causes the display device to indicate that the main inspection is no longer valid. The display device can be modified here in any way and, in particular, the vehicle registration number can also be changed to a specific color.

The disclosed embodiments also relate to a method for running a system for operating a digital license plate, in particular such a system according to one of the aspects presented above, and comprises the steps of: transmitting a unique identifier of a digital license plate to a central server, optionally together with supplementary documents for the registration of a motor vehicle (in particular, the registration certificate part 2, which was previously also called the "vehicle title"), creating and transmitting a file from the central server to the digital license plate, wherein the file contains a vehicle registration number for display by the license plate, wherein, optionally, in addition to the vehicle registration number, further information to be displayed via the display device of the license plate is contained in the file, receiving the file sent from the central server by the receiving and/or transmitting unit and storing the file in the storage unit, checking the authenticity of the file stored in the storage unit for its source and, if the checking of the source has been successfully completed, forwarding a confirmation of this to the control unit, and displaying the vehicle registration number contained in the file and any other information contained in the file by the display device if the control unit has received a confirmation of the successful authenticity check.

For example, a vehicle can be de-registered by sending the specific identifier of a license plate together with any other evidence digitally to the registration office, which carries out the desired de-registration so that the file stored in the central server for the license plate is modified accordingly. With the subsequent transmission of the file to the associated license plate initiated by the central server, the file contains the instruction to block the registration. This is done, for example, by displaying the vehicle registration number in a specific color or by no longer displaying the vehicle registration number by the display device.

It may be provided here that the unique identifier of the digital license plate, which is sent to a central server, is encrypted in advance in the digital license plate using the encryption and decryption unit in order to make communication with the central server even more secure.

Furthermore, according to a development of the method according to the disclosed embodiments, it may be provided that the file to be sent from the central server to the digital license plate contains a time period which specifies how long the vehicle registration number can be displayed without changing the display device. The time period, therefore, defines the validity of the vehicle registration number displayed by the display device.

In principle, it may be required that a connection to the central server must be established once a day for the unchanged (valid) display of the vehicle registration number by the display device, as otherwise the control unit is designed to modify the display device accordingly after the predetermined time period has elapsed, so that it is immediately apparent to third parties that the vehicle bearing the license plate might no longer be registered.

Further details, features and advantages of the disclosed embodiments will become apparent from the following description of the figures. In the figures, FIG. 1A-D each show a schematic overview of one of several states of the system for operating a digital license plate.

FIG. 1A shows a system 10 for operating a digital license plate 1 during initialization. It can be seen that the display device 2 does not yet display a vehicle registration number, as the file required for this has not yet been received. When the digital license plate 1 is used for the first time and a new vehicle is registered, it is intended that the digital license plate 1 contacts a server 3 and transmits the unique identifier of the digital license plate 1 to the server 3. In addition, supplementary documents required for the registration can be transmitted in order to complete the application for the new registration of a motor vehicle. For example, the registration certificate part 2 (previously also called the "vehicle title") can be transmitted digitally or by post to the registration office so that all documents required for the registration are available.

The information sent from the digital license plate 1 to the server 3 may be transmitted in encrypted form using the encryption and decryption unit in order to make misuse more difficult or prevent it.

After receiving the unique identifier of the digital license plate, the server 3 performs a database search to check whether the unique identifier of the license plate is already stored in the database. If this is not the case, a new entry is created in the database and it is checked whether all the requirements for the vehicle's registration have been met. If this is the case, a vehicle registration number is assigned to the digital license plate 1, which can be identified by the unique identifier, and the database entry is updated accordingly.

FIG. 1B shows the transmission of the file containing the vehicle registration number to the digital license plate 1. After successful approval by the server 3, in which it is recorded that a vehicle registration number is assigned to the digital license plate 1, a file containing the vehicle registration number is generated and transmitted to the digital license plate 1. This file can be transmitted in encrypted form.

FIG. 1C shows the system 10 after the digital license plate 1 has received from the server 3 the file containing the vehicle registration number. After any decryption by the encryption and decryption unit, the file sent by the server 3 is checked by the authentication unit. This ensures that the file actually originates from server 3 and that such a file has not been sent by an unauthorized third party. Once the authentication unit has confirmed that the file originates from the server 3, the control unit in the digital license plate 1 can instruct the display device 2 to display the vehicle registration sequence contained in the file. In FIG. 1C, this exemplary vehicle registration sequence is "M-SK 1234". A person skilled in the art is aware that any other combination of letters, digits and special characters can be used as a registration sequence.

The digital license plate 1 can now be attached to a vehicle, provided the license plate is not already permanently installed on a vehicle.

FIG. 1D shows a state of the system 10 in which a file is sent from the server 3 to the digital license plate 1 in order to change the display of the vehicle registration sequence. For example, the vehicle provided with the digital license plate 1 may have been reported as stolen, whereupon the police access the database via an interface and modify the database entry associated with the license plate accordingly. The server 3 then sends the correspondingly updated file to the digital license plate 1, whereupon, after the authenticity of the file sent by the server 3 has been established in the digital license plate 1, the original display of the display device is changed in order to make it immediately recognizable to third parties that the vehicle provided with the license plate is possibly a stolen vehicle.

In the present case, the display device 2 is controlled in such a way that the vehicle registration sequence, which in its original version is a black combination of letters and numbers on a white background, is inverted in its color scheme so that the vehicle registration sequence is displayed in white on a black background. It is clear to a person skilled in the art that a change in the color of the letter and number combination of the vehicle registration sequence, a flashing display, the addition of further information in the display device or the like are also potential options for displaying a possibly stolen vehicle. It is just as possible to show further additional symbols in the region of the display device in order to draw attention to a supposedly stolen vehicle.

The invention claimed is:

1. A digital license plate for a motor vehicle, the digital license plate comprising:
    a display device for displaying a sequence of letters and/or digits to form a vehicle registration number,
    a storage unit for storing files,
    an authentication unit for authenticating a file stored in the storage unit to a predetermined source,
    an encryption unit for encrypting and decrypting a file stored in the storage unit,
    a transmitting and/or receiving unit for wireless or wired interaction with a server, and
    a control unit configured to control the display device to display, by the display device, a vehicle registration number contained in a file in response to confirmation by the authentication unit that the file originates from the predetermined source,
    wherein the encryption unit encrypts files containing vehicle registration numbers prior to transmission to a central server,
    wherein the control unit is further configured to cause a vehicle registration number contained in a file to be displayed, unchanged, by the display device only within a predetermined time period, so that the continuous display of a valid vehicle registration number requires the repeated receipt and verification of the authenticity of a file containing the vehicle registration number, and
    wherein the time period defining how long the display device displays the vehicle registration number contained in the file unchanged is defined by a component of the file itself, wherein the time period is 1 day, 1 week, 1 month or 1 year.

2. The license plate of claim 1, wherein in response to the predetermined time period elapsing without the repeated receipt and/or successful verification of the authenticity of a file containing the vehicle registration number, the control unit is further) configured to change the display of the display device to indicate a possible invalidity of the vehicle registration number, wherein the change of the display device comprises the display of the vehicle registration number in a specific color deviating from the standard.

3. The license plate of claim 1, wherein the file further comprises a component which, after successful verification of the file by the authentication unit, causes the control unit to change the display of the display device to display various properties associated with the vehicle registration number by the display device to cause the vehicle registration number to be displayed in a specific color deviating from the standard in the case of a vehicle registration number registered as stolen.

4. The license plate of claim 1, wherein the information regarding the predetermined source, with respect to which the authentication unit checks a file, is preset in the license plate such that it is no longer possible to change the information regarding the predetermined source after an original initialization.

5. The license plate of claim 1, wherein the display device is an LCD, LED and/or an OLED display.

6. The license plate of claim 1, wherein each license plate is provided with a unique identifier for communicating with a server.

7. A system for operating a digital license plate, the system comprising:
    digital license plate of claim 1, and
    a central server which has a database and is configured to communicate with the digital license plate via a transmitting and/or receiving unit,
    wherein the database contains all license plates known to the central server, and
    wherein the central server is configured to send a file to a digital license plate, whereupon the latter, after successful verification of the authenticity of the received file, displays the vehicle registration numbers contained in the file and any further additional information contained in the file by the display device.

8. The system of claim 7, wherein the central server has at least one interface for accessing the database to modify properties of a license plate stored in the database, wherein the at least one interface enables access by the registration authority, the police, customs or other companies performing sovereign tasks.

9. A method for running a system for operating a digital license plate, the method comprising:
encrypting a unique identifier of a digital license plate to a central server together with supplementary documents for registration of a motor vehicle,
transmitting the encrypted unique identifier of the digital license plate to the central server together with supplementary documents for registration of motor vehicle,
creating and transmitting a file from the central server to the digital license plate, wherein the file contains a vehicle registration number for display by the license plate, wherein, in addition to the vehicle registration number, further information to be displayed via a display device of the license plate is contained in the file,
receiving the file sent from the central server by a receiving and/or large transmitting unit and storing the file in a storage unit,
verifying the authenticity of the file stored in the storage unit for its source and, in response to the verification of the source has been successfully completed, forwarding a confirmation of this to the control unit, and
displaying the vehicle registration number contained in the file and any other information contained in the file by the display device in response to the control unit having received a confirmation of the successful authenticity verification,
wherein the control unit is configured to cause a vehicle registration number contained in a file to be displayed, unchanged, by the display device only within a predetermined time period, so that the continuous display of a valid vehicle registration number requires the repeated receipt and verification of the authenticity of a file containing the vehicle registration number, and wherein the time period defining how long the display device displays the vehicle registration number contained in the file unchanged is defined by a component of the file itself, wherein the time period is 1 day, 1 week, 1 month or 1 year.

10. The method of claim 9, wherein the file to be sent from the central server to the digital license plate contains the time period which specifies how long the vehicle registration number can be displayed by the display device without change.

11. The method of claim 9, wherein in response to the predetermined time period elapsing without the repeated receipt and/or successful verification of the authenticity of a file containing the vehicle registration number, the control unit changes the display of the display device to indicate a possible invalidity of the vehicle registration number, wherein the change of the display device comprises the display of the vehicle registration number in a specific color deviating from the standard.

12. The method of claim 9, wherein the file further comprises a component which, after successful verification of the file by the authentication unit, causes the control unit to change the display of the display device to display various properties associated with the vehicle registration number by the display device to cause the vehicle registration number to be displayed in a specific color deviating from the standard in the case of a vehicle registration number registered as stolen.

13. The method of claim 9, wherein the information regarding the predetermined source, with respect to which the authentication unit checks a file, is preset in the license plate such that it is no longer possible to change the information regarding the predetermined source after an original initialization.

14. The method of claim 9, wherein the display device is an LCD, LED and/or an OLED display.

15. The method of claim 9, wherein each license plate is provided with a unique identifier for communicating with a server.

16. The method of claim 9, wherein a central server, which has a database, communicates with the digital license plate via a transmitting and/or receiving unit,
wherein the database contains all license plates known to the central server, and
wherein the central server sends a file to a digital license plate, whereupon the latter, after successful verification of the authenticity of the received file, displays the vehicle registration numbers contained in the file and any further additional information contained in the file by the display device.

17. The method of claim 16, wherein the central server accesses the database using at least one interface to modify properties of a license plate stored in the database, wherein the at least one interface enables access by the registration authority, the police, customs or other companies performing sovereign tasks.

* * * * *